United States Patent
Irie et al.

(10) Patent No.: US 8,606,327 B2
(45) Date of Patent: Dec. 10, 2013

(54) MOBILE TERMINAL, DISPLAY SWITCHING METHOD AND DISPLAY SWITCHING PROGRAM

(75) Inventors: Kakeru Irie, Osaka (JP); Kyousuke Ono, Osaka (JP); Hidetoshi Hachiya, Osaka (JP)

(73) Assignee: KYOCERA Corporation, Kyoto (JP)

( * ) Notice: Subject to any disclaimer, the term of this patent is extended or adjusted under 35 U.S.C. 154(b) by 589 days.

(21) Appl. No.: 12/679,468

(22) PCT Filed: Sep. 25, 2008

(86) PCT No.: PCT/JP2008/002671
§ 371 (c)(1),
(2), (4) Date: Mar. 22, 2010

(87) PCT Pub. No.: WO2009/041050
PCT Pub. Date: Apr. 2, 2009

(65) Prior Publication Data
US 2010/0197355 A1 Aug. 5, 2010

(30) Foreign Application Priority Data
Sep. 28, 2007 (JP) .................................. 2007-255086

(51) Int. Cl.
*H04B 1/38* (2006.01)
*H04W 4/00* (2009.01)

(52) U.S. Cl.
USPC ............ 455/566; 455/567; 455/466; 455/575

(58) Field of Classification Search
USPC ........ 455/550.1, 566, 567, 575.1, 575.4, 90.1
See application file for complete search history.

(56) References Cited

U.S. PATENT DOCUMENTS

| | | | | |
|---|---|---|---|---|
| 7,218,916 B2 * | 5/2007 | Nonami | ...................... | 455/412.1 |
| 7,283,810 B1 * | 10/2007 | Arakawa et al. | ........... | 455/414.1 |
| 8,126,521 B2 * | 2/2012 | Griffin et al. | ............... | 455/575.4 |
| 2004/0132512 A1 * | 7/2004 | Yajima | ........................ | 455/575.3 |
| 2005/0181846 A1 | 8/2005 | Taneya et al. | | |
| 2005/0264436 A1 * | 12/2005 | Yamamoto et al. | ............. | 341/50 |
| 2007/0281759 A1 * | 12/2007 | Choi | .......................... | 455/575.1 |

(Continued)

FOREIGN PATENT DOCUMENTS

| | | |
|---|---|---|
| JP | 2003-258951 | 9/2003 |
| JP | 2003-258951 A | 9/2003 |

(Continued)

OTHER PUBLICATIONS

Notification of Reasons for Refusal dated Jul. 29, 2011, issued for counterpart Korean Patent Application No. 2010-7009269.

*Primary Examiner* — Tilahun B Gesesse
(74) *Attorney, Agent, or Firm* — Procopio, Cory, Hargreaves & Savitch LLP

(57) ABSTRACT

A mobile terminal is a transformable terminal such as a sliding mobile telephone and a folding mobile telephone. The mobile terminal includes a sensor for detecting whether or not the mobile terminal is in a predetermined form. When keys for entering characters are exposed and the sensor detects that the mobile terminal is in the predetermined form, the mobile terminal displays a reply mail. When the sensor detects that the mobile terminal is not in the predetermined form, the mobile terminal displays the received mail. Thus, the mobile terminal can switch display content between the reply mail and the received mail by a simple operation of changing a form of the mobile terminal.

13 Claims, 13 Drawing Sheets

(56) References Cited

U.S. PATENT DOCUMENTS

| | | | |
|---|---|---|---|
| 2009/0061950 A1* | 3/2009 | Kamachi et al. | 455/566 |
| 2009/0270116 A1* | 10/2009 | Bao et al. | 455/466 |
| 2009/0325609 A1* | 12/2009 | Rosen et al. | 455/466 |
| 2010/0151889 A1* | 6/2010 | Chen et al. | 455/466 |

FOREIGN PATENT DOCUMENTS

| | | |
|---|---|---|
| JP | 2004-120436 | 4/2004 |
| JP | 2005-311668 | 11/2005 |
| JP | 2006-287481 | 10/2006 |
| JP | 2006285345 | 10/2006 |

\* cited by examiner

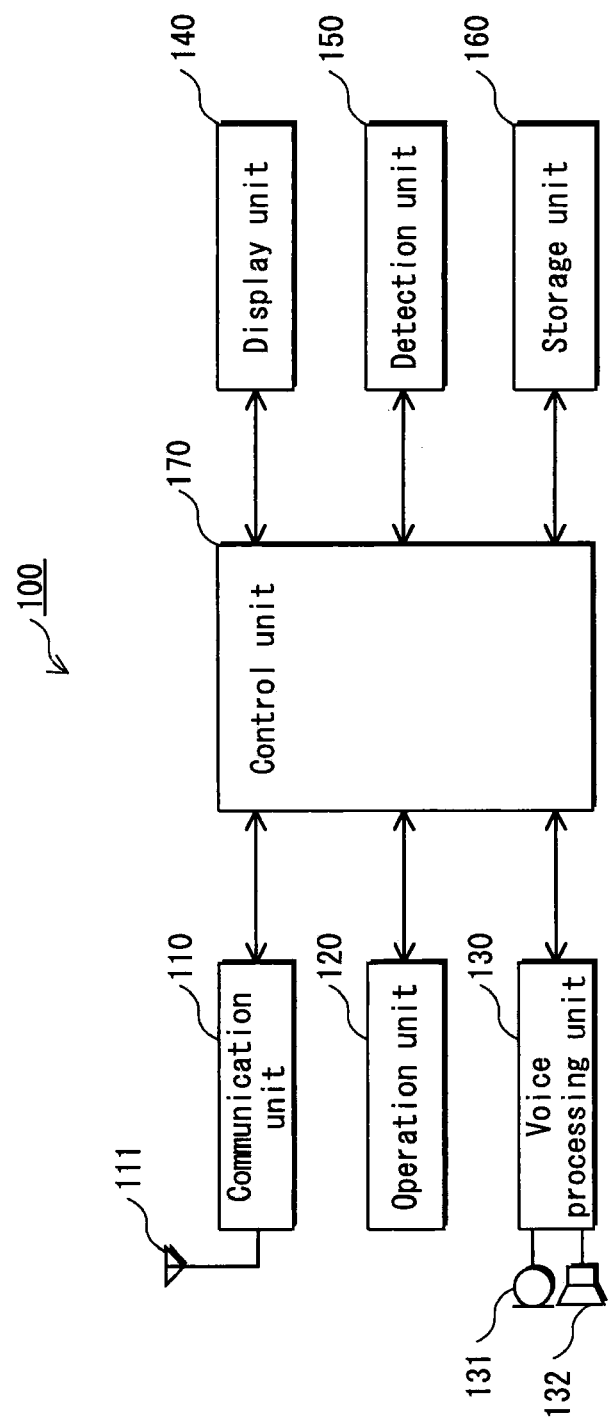

FIG. 3

300
301 — recievedNo. : 760
302 — To: Taro@docono.ne.jp
303 — From: hanako@docono.ne.jp
304 — Subject: Hiking
305 —
Hello.

It is getting cooler as the summer heat has worn off. How are things with you?
 By the way, we are thinking to go hiking with the following schedule. Could you join us?

Date: November 10
Place: Arashiyama in Kyoto

We are looking forward to your favorable reply.

FIG. 4

```
                    ┌─ 400
401 ─┐              │
     ┌──────────────┴──────────────────────┐
     │ sendNo. : 881                       │
402 ─┤                                     │
     │ To: hanako@docono.ne.jp             │
403 ─┤                                     │
     │ From: Taro@docono.ne.jp             │
404 ─┤                                     │
     │ ReferNo. : 760                      │
405 ─┤                                     │
     │ Subject: Re-Hiking                  │
406 ─┤                                     │
     │ Hello.                              │
     │                                     │
     │ I am doing well.                    │
     │ You must be doing well, too.        │
     │                                     │
     │ Anyways, thank you for asking me to go hiking with you. │
     │                                     │
     │ I am free on that date, so I would love to join you.    │
     │                                     │
     │ I am looking forward to hearing from you for details.   │
     │                                     │
     └─────────────────────────────────────┘
```

FIG. 8
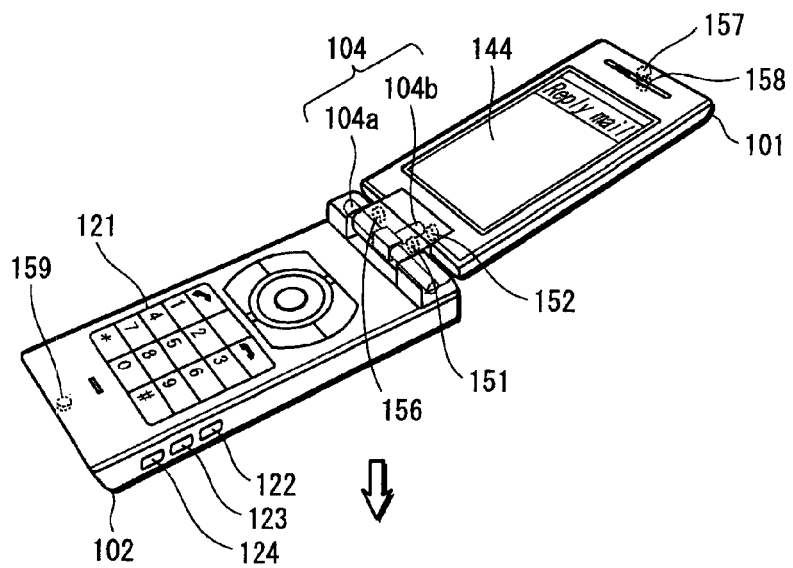
(a)
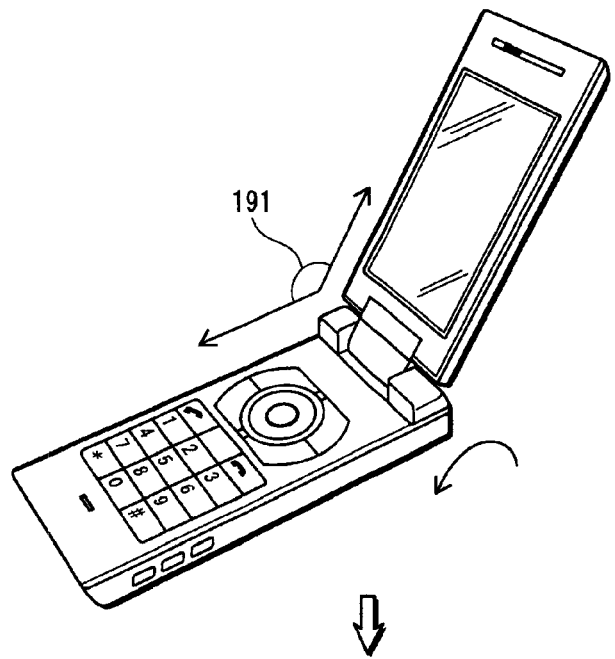
(b)
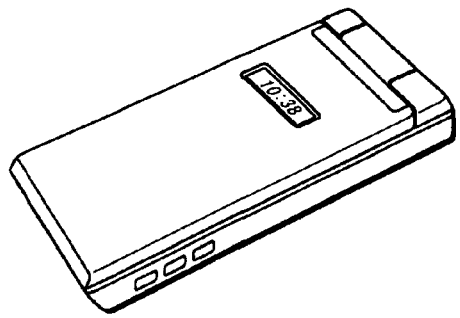
(c)

MOBILE TERMINAL, DISPLAY SWITCHING METHOD AND DISPLAY SWITCHING PROGRAM

CROSS REFERENCE TO RELATED APPLICATIONS

This application is the U.S. National Stage application of PCT application PCT/JP2008/002671 filed on Sep. 25, 2008, which claims priority under 35 U.S.C. §119 to Japanese Patent Application No. 2007-255086 filed on Sep. 28, 2007, and the contents of each of these applications are incorporated herein by reference in their entirety.

FIELD OF THE INVENTION

The present invention relates to a mobile terminal, and in particular to a method of displaying a received mail and a reply mail.

BACKGROUND

When using a mobile terminal such as a mobile telephone, a user wants to check, in some cases, a received mail in creating a reply mail to the received mail. Since a screen of the mobile terminal is smaller compared to a screen of a personal computer, for example, various methods have been devised for checking the received mail in creating the reply mail with use of the mobile terminal.

An example of the methods for checking the received mail in creating the reply mail is a quote-and-reply method in which a text of the received mail is included in the reply mail.

Another example of such methods is a method for dividing a display screen into two areas so as to display the received mail on one of the areas while displaying the reply mail on the other one of the areas.

Also, recent mobile telephones can simultaneously execute a plurality of tasks in a multi-task execution method. Therefore, with the recent mobile telephones, even while the user creates the reply mail, the received mail can be displayed by taking a plurality of procedures of selecting a mail menu from menus, selecting a received mail folder from mail folders and selecting a desired received mail from the received mail folder.

SUMMARY OF THE INVENTION

However, the user needs to execute a complicated operation including the above-stated procedures in order to check the received mail in the multi-task execution method. Also, in the case of displaying both the reply mail and the received mail on the display screen by dividing the display screen into two areas, a full-text of the received mail is not displayed on the display screen in many cases since the already-small display screen is divided into two. This causes the user to frequently scroll through the text of the received mail for checking the received mail. Accordingly, it is troublesome that the user has to repeatedly perform a plurality of input operations of opening the menu screen to select one of the mails as an operational target, selecting the received mail to be used and subsequently scrolling through the received mail.

Also, in the quote-and-reply method, the user has to check a quoted text by performing an operation of frequently scrolling through the reply mail if the text of the received mail is long. Therefore, it is troublesome that the user has to repeatedly perform the operation of scrolling through the reply mail from a cursor position to a position to which the user wants to scroll in order to check the quoted text.

The present invention has an objective to provide a mobile terminal that is capable of more easily checking the text of the received mail in creating the reply mail without causing the user to perform such the above-stated troublesome input operations.

The mobile terminal according to present invention is a mobile terminal that transforms between a first form and a second form, the mobile terminal comprising: a display unit; a reception unit operable to receive a mail; a detection unit operable to detect whether or not the mobile terminal is in the first form; and a display control unit operable, when the detection unit detects that the mobile terminal is not in the first form while the display unit displays a reply mail to the received mail, to control the display unit to switch to displaying the received mail.

Also, the mobile terminal according to the present invention is a display switch method that is: for switching between a reply mail and a received mail; and used in a mobile terminal that transforms between a first form and a second form, the display switch method comprising: a reception step of receiving a mail; a reply mail display step of displaying the reply mail to the received mail that has been received in the reception step; a detection step of detecting whether or not the mobile terminal is in the first form; and a display control unit step of, when the detection step detects that the mobile terminal is not in the first form while the reply mail display step displays the reply mail, switching to displaying the received mail.

Also, the mobile terminal according to the present invention is a display switch program that includes a processing procedure that causes a computer of a mobile terminal to switch between a reply mail and a received mail, the mobile terminal transforming between a first form and a second form, the processing procedure comprising: a reception step of receiving a mail; a reply mail display step of displaying the reply mail to the received mail that has been received in the reception step; a detection step of detecting whether or not the mobile terminal is in the first form; and a display control unit step of, when the detection step detects that the mobile terminal is not in the first form while the reply mail display step displays the reply mail, switching to displaying the received mail.

Here, the reply mail is a reply to the mail received at the mobile terminal, and is to be sent or has been sent to an address of a sender of the received mail. Displaying the reply mail or the received mail means at least displaying a text thereof. Also, the user creates and edits the reply mail by an operation of entering characters. Note that the user begins creating the reply mail by selecting a menu for creating the reply mail with the received mail displayed or the received mail selected from a received mail list so that an application program for creating the reply mail starts.

According to the present invention, the display unit includes an element for outputting display data to a display, for example, on which the display data is to be displayed.

With such a structure, the mobile terminal transforms between two forms as with a mobile telephone such as a folding mobile telephone or a sliding mobile telephone, associates the two forms with the received mail and the reply mail respectively, and switches display content between the reply mail and the received mail by changing the form of the mobile terminal. Therefore, it is easy to switch the display content from the reply mail to the received mail without a complicated menu selection operation.

BRIEF DESCRIPTION OF THE DRAWINGS

FIG. 1 is a functional block diagram showing a functional structure of a mobile telephone 100;

FIG. 3 shows one example of a conceptual data structure of a received mail;

FIG. 4 shows one example of a conceptual data structure of a reply mail;

FIG. 8A to FIG. 8C each show an external view of the mobile telephone 100 that is a biaxial hinge-type mobile telephone, as a modification of the first embodiment;

DETAILED DESCRIPTION

1. First Embodiment

Figure 2A:
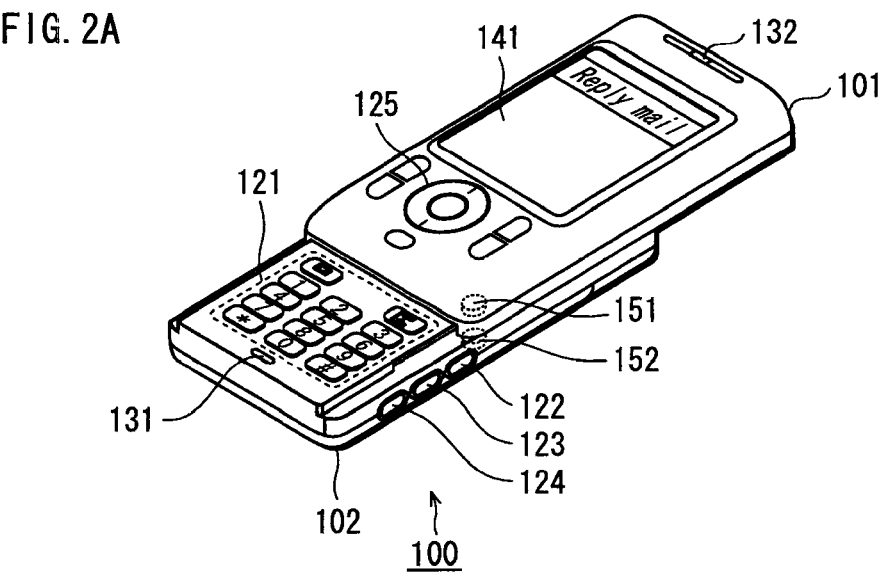
FIG. 2A to FIG. 2C each show an external view of the mobile telephone 100.

The following describes a mobile telephone which is one embodiment of a mobile terminal of the present invention with use of drawings.

Outline

A transformable mobile telephone such as a sliding mobile telephone or a folding mobile telephone switches display content between a reply mail and a received mail according to two forms. In one of the forms, a user can enter a text of the reply mail. In the other one of the forms, the user cannot enter the text of the reply mail. Specifically, the reply mail is displayed when the mobile telephone is in an open state in which the numerical keys are exposed so that the user can enter the text of the reply mail, while the received mail is displayed when the mobile telephone is in a closed-state in which the numerical keys are covered so that the user cannot enter the text of the reply mail.

Structure

FIG. 1 shows a functional block diagram showing a functional structure of a mobile telephone 100.

As shown in FIG. 1, the mobile telephone 100 is composed of a communication unit 110, an operation unit 120, a voice processing unit 130, a display unit 140, a detection unit 150, a storage unit 160 and a control unit 170.

The communication unit 110 has functions of demodulating a signal received from an antenna 111 into a received voice signal and a received data signal, and outputting, to the control unit 170, the received voice signal and the received data signal that have been demodulated. Also, the communication unit 110 has functions of demodulating a transmitting voice signal on which A/D conversion is performed by the voice processing unit 130 and a transmitting data signal such as an e-mail received from the control unit 170, and outputting, to the antenna 111 for communication, the transmitting voice signal and the transmitting data signal that have been demodulated.

The operation key 120 includes a group of numerical keys, an on-hook key, an off-hook key, a directional key, a determination key, a mail key, a side key and the like. The operation key 120 has functions of receiving a user operation and outputting the received user operation to the control unit 170.

The voice processing unit 130 has functions of performing the A/D conversion on the received voice signal outputted from the communication unit 110 so as to output the A/D converted signal to a speaker 132, and performing the A/D conversion on the transmitting voice signal received from a microphone 131 so as to output the A/D converted signal to the control unit 170.

The display unit 140 includes a display such as a liquid crystal display (LCD), and has a function of displaying an image on the display according to an instruction by the control unit 170.

Figure 2B:
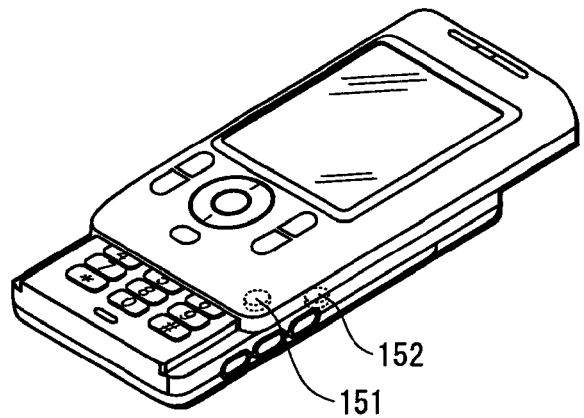
Figure 2C:
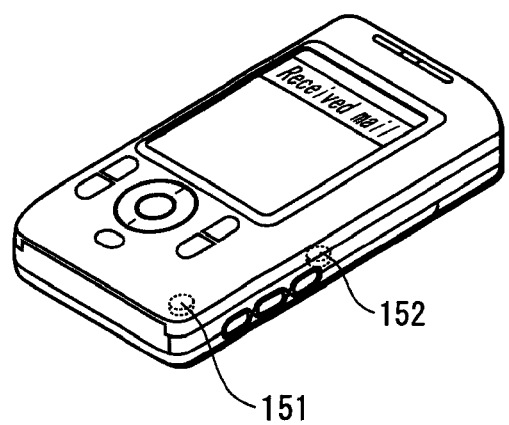

The detection unit 150 is composed of a magnet sensor 151 and a magnet 152 as shown in FIG. 2A to FIG. 2C. The detection unit 150 has a function of detecting whether the mobile telephone 100 is in a first form or not according to whether the magnet sensor 151 detects the magnet 152. When the mobile telephone 100 is in the first form, upper and lower casings of the mobile telephone 100 are open, the group of numeric keys are exposed, and the upper and lower casings satisfy a predetermined relationship. The first form and the detection thereof are described later with use of an external view of each of FIG. 2A to FIG. 2C.

The storage unit 160 is composed of a ROM (read only memory) and a RAM (read access memory), and is realized by a compact hard disk or a non-volatile memory, for example. The storage unit 160 has a function of storing music data and image data in addition to types of data pieces and programs that are necessary for an operation of the mobile telephone 100.

The control unit 170 has a function of controlling each unit of the mobile telephone 100, and the following functions in addition to the functions included in a usual mobile telephone.

The control unit 170 controls the display unit 140 to display a screen for creating the reply mail when an input by the user for creating the reply mail is executed by the operation unit 120 with the display unit 140 displaying the received mail. The control unit 170 monitors the signal having been outputted from the detection unit 150 and showing whether or not the mobile telephone 100 is in the first form while controlling the display unit 140 to display the screen for creating the reply mail when the mobile telephone 100 is in the first form. Upon receiving the signal showing that the mobile telephone 100 is not in the first form, the control unit 170 controls the display unit 140 to display the received mail corresponding to the reply mail.

Also, when the mobile telephone 100 is not in the first form, the control unit 170 monitors, while the display unit 140 displays the received mail, the signal having been outputted from the detection unit 150 and showing whether or not the mobile telephone 100 is in the first form. Upon receiving the signal showing that the mobile telephone 100 is in the first form, the control unit 170 controls the display unit 140 to display the reply mail.

In order to control the display unit 140 to display the received mail for the first time, the control unit 170 reads the received mail corresponding to the reply mail from the storage unit 160, and stores the received mail in a predetermined area of the RAM included in the storage unit 160. In order to control the display unit 140 to display the received mail for the second time onwards, the control unit 170 reads the received mail from the predetermined area, and then controls the display unit 140 to display the received mail. Also, the reply mail is stored in the predetermined area of the RAM included in the storage unit 160 used at the time of creating the reply mail. When display content is switched from the received mail to the reply mail, the control unit 170 reads data on the reply mail from the predetermined area, and controls the display unit 140 to display the reply mail again. Note that while the screen for creating the reply mail is displayed, the control unit 170 performs control such that the user can edit the text of the reply mail by the key operation as with a conventional method.

Each of FIG. 2A to FIG. 2C shows an external view of the mobile telephone 100. As shown in FIG. 2A to FIG. 2C, the mobile telephone 100 is a sliding mobile telephone that is transformable such that an upper casing 101 and a lower casing 102 slide parallel to one another. As shown in FIG. 2A to FIG. 2C, the mobile telephone 100 is transformable. The first form of the sliding mobile telephone is a state in which the group of numerical keys are fully exposed and the casings are open as shown in FIG. 2A. Also, the second form of the sliding mobile telephone is a state in which the group of numerical keys are covered by the upper casing 101 as shown in FIG. 2C.

As shown in FIG. 2A, when the mobile telephone 100 is in the first form, the upper casing 101 and the lower casing 102 are displaced from one another so that the group of numerical keys are fully exposed. Also, the magnet sensor 151 provided inside the upper casing 101 and the magnet 152 provided inside the lowercasing 102 are at a matching position. In such a state, the mobile telephone 100 outputs the signal showing that the magnet sensor 151 detects the magnet 152 (i.e. the mobile telephone 100 is in the first form). Also, the mobile telephone 100 includes side keys 122 to 124.

In states shown in FIG. 2B and FIG. 2C, the magnet sensor 151 and the magnet 152 are not at the matching position. Therefore, the magnet sensor 151 outputs, to the control unit 170, the signal showing that the magnet 152 can not detected (i.e. the signal showing that the mobile telephone 100 is not in the first form).

Data

The following describes the received mail and the reply mail.

The received mail is described in the following with use of FIG. 3. The received mail shown in FIG. 3 is an example of a conceptual data structure of the received mail. As shown in FIG. 3, a received mail 300 includes a received number column 301, a destination address column 302, a sender column 303, a title column 304 and a received mail text column 305.

The received number column 301 includes a management number so that the mobile telephone 100 can manage and identify the received mail 300. In this example, the management number is 760.

The destination address column 302 includes an address of a device to which the received mail 300 is sent, and is basically an address registered in the mobile telephone 100. In this example, the address is "Taro@docono.ne.jp".

The sender column 303 includes an address of a device that has sent the received mail 300. In this example, the address is "hanako@docono.ne.jp".

The title column 304 includes a title having been given by a sender of the received mail 300 and usually shows what the received mail 300 is about.

The received mail text column 305 includes information on the text of the received mail 300.

FIG. 4A shows a conceptual data structure of the reply mail. The reply mail 400 is a reply to the received mail 300.

The reply mail 400 includes a send number column 401, a destination address column 402, a sender column 403, a reference number column 404, a title column 405 and a reply mail text column 406.

The send number column 401 includes a management number so that the mobile telephone 100 can manage and identify the reply mail 400. In this example, the send number is "881".

The destination address column 402 includes the address of the device to which the reply mail 400 is to be sent. In this example, the destination address 402 is an address of the sender of the received mail 300 "hanako@docono.ne.jp" since the reply mail 400 is a reply to the received mail 300.

The sender column 403 includes the address of the device that sends the reply mail 400, and includes basically an address of the mobile telephone 100, which is "Taro@docono.ne.jp".

The reference number 404 includes a reference number for the mobile telephone 100 to recognize that the reply mail 400 is a reply to the received mail 300. In the reference number column 404 is written the received number "760" which indicates the received mail 300. With the reference number 404, the control unit 170 can read, from the storage unit 160, a correct received mail corresponding to the reply mail. When the user selects an operation for creating the reply mail after either having one of the received mails displayed or selecting the one received mail from the received mail list being displayed, the control unit 170 registers a number in the received number column 404 of the one of the received mails.

The title column 405 includes a title of the reply mail 400. In this example, the title is "Re-Hiking".

The reply mail text column 406 includes the text of the reply mail 400.

Operations

Figure 5:
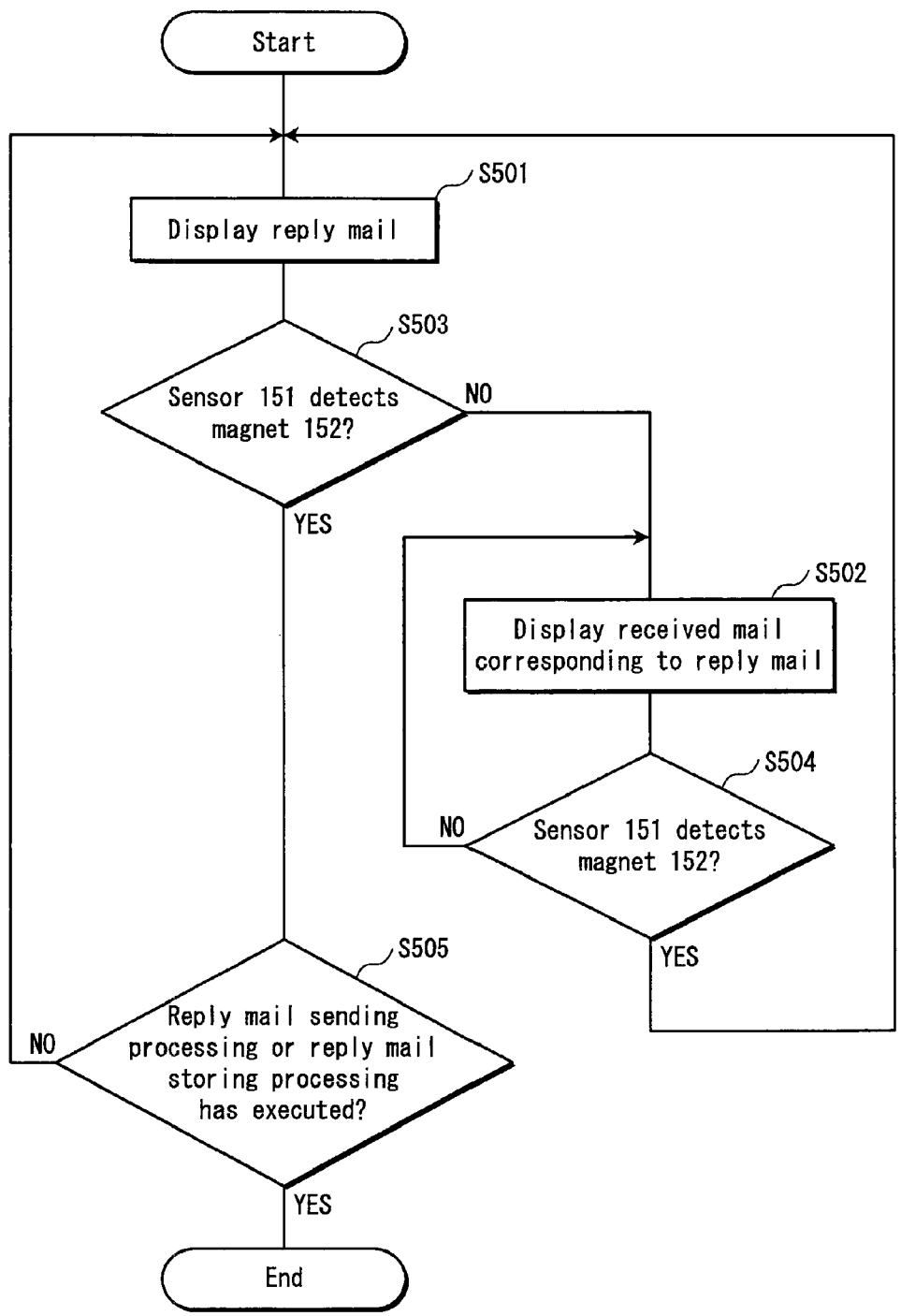
FIG. 5 is a flowchart showing an operation of the mobile telephone 100 when a user creates the reply mail.

The following describes an operation in the present embodiment with use of a flowchart shown in FIG. 5.

When the control unit 170 starts an application program for creating the reply mail upon reception of an input from the user via the operation unit 120, the display unit 140 included in the mobile telephone 100 displays a screen for creating the reply mail (hereinafter, the "creation screen of the reply mail" is simply referred to as the "reply mail") on the display (Step S501).

While the reply mail is displayed, the detection unit 150 included in the mobile telephone 100 judges whether or not the magnet sensor 151 detects the magnet 152 (i.e. whether or not the mobile telephone 100 is in the first form) (Step S503).

When the magnet sensor 151 detects the magnet 152 (Step S503: YES), the control unit 170 included in the mobile telephone 100 recognizes that the mobile telephone 100 is in the first form, and detects whether the transmitting processing of the reply mail or storage processing of the reply mail has been executed (Step S505).

If the transmitting processing of the reply mail or the storage processing of the reply mail has not been executed (Step S505: NO), the mobile telephone 100 returns to Step S501 and executes subsequent processing.

If the transmitting processing of the reply mail or the storage processing of the reply mail has been executed (Step S505: YES), the control unit 170 included in the mobile telephone 100 ends the application program for creating the reply mail.

When the magnet sensor 151 stops detecting the magnet 152 (Step S503: NO), the control unit 170 included in the mobile telephone 100 reads, from the storage unit 160, the received mail having the received mail number corresponding to the number written in the reference number column of the reply mail, and has the text of the received mail displayed on the display (Step S502). Once the received mail corresponding to the reply mail has been displayed, the text of the received mail is stored in a predetermined area of the storage unit 160. Each time the control unit 170 controls the display unit 140 to display the received mail on the display, the control unit 170 included in the mobile telephone 100 reads data of the received mail from the predetermined area. Note that information on a start line position of the text shown on the display screen, for example, is stored at the time of switching the display content between the reply mail and the received mail. When controlling the display unit 140 to display one of the received mail and the reply mail again after the switching, the control unit 170 determines which part of the one of the mails is to be displayed with reference to the start line position. In other words, when the display unit 140 displays again, after displaying the other one of the mails, the one of the mails that has been displayed, the control unit 170 controls the display unit 140 to display part of the text of the one of the mails that has been immediately previously displayed on the display.

While the display unit 140 displays the received mail, the magnet sensor 151 included in the detection unit 150 detects the magnet 152 (Step S504). Until the magnet sensor 151 detects the magnet 152 (Step S504: NO), the display unit 140 keeps on displaying the received mail (Step S502) since the mobile telephone 100 is not in the first form.

When the magnet sensor 151 detects the magnet 152 (Step S504: YES), it is shown that the mobile telephone 100 returns to the first form. Therefore, the control unit 170 controls the display unit 140 to switch the display content from the received mail to the reply mail (Step S501).

This concludes the description of the operation of the mobile telephone 100 regarding the switching of the display content between the reply mail and the received mail.

Figure 6:
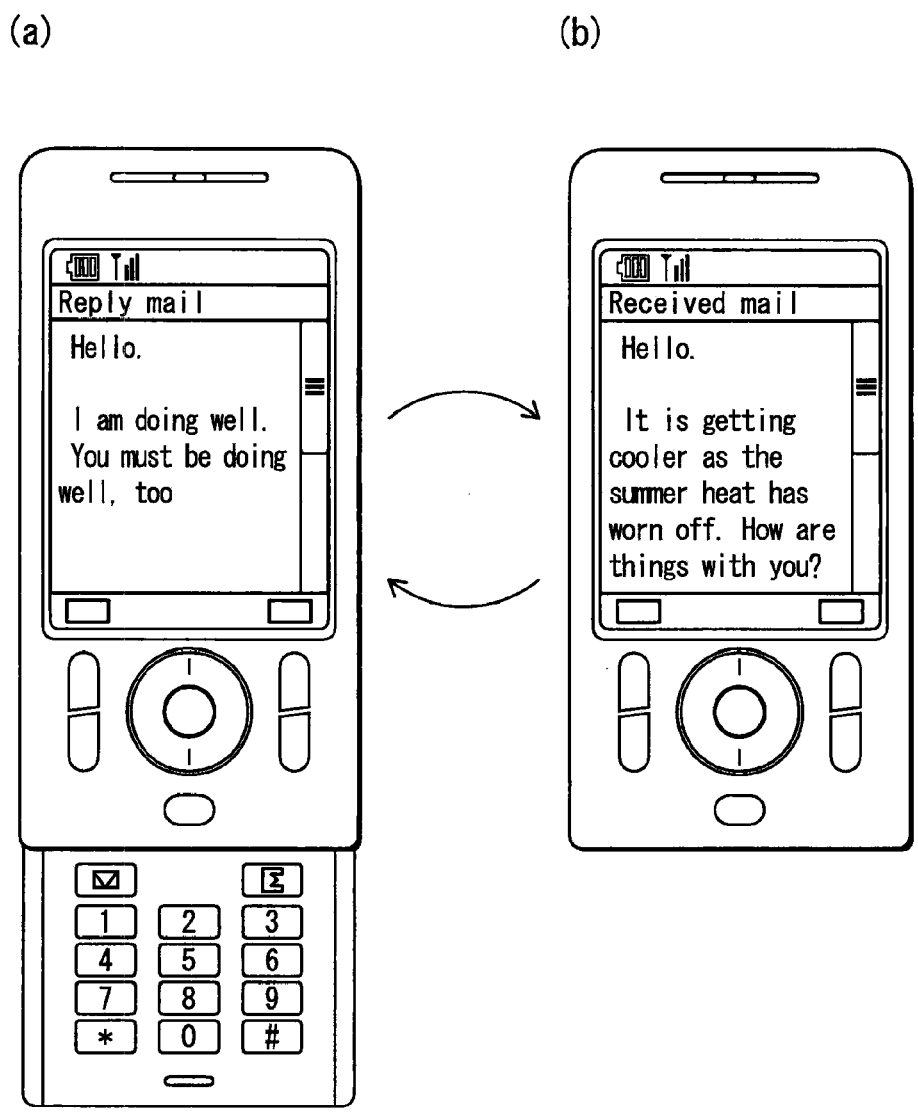
FIG. 6A shows that the mobile telephone 100 displays the reply mail in a first form.
FIG. 6B shows that the display unit 140 displays the received mail in a second form.

In such a way, the switching of the display content can be performed between the reply mail and the received mail by changing the form of the mobile telephone 100 as shown in FIG. 6A and FIG. 6B. FIG. 6A shows that the mobile telephone 100 is in the first form, and that the reply mail is displayed. FIG. 6B shows that the mobile telephone 100 is in the second form, and that the received mail is displayed. It can be seen from FIGS. 6A and 6B that the switching of the display content between the reply mail and the received mail is facilitated by changing the form of the mobile telephone 100. This makes an operation less complicated when the user checks the received mail while creating the reply mail.

Also, in the state shown in FIG. 2B, the display unit 140 displays the received mail. Since the user cannot enter the text of the reply mail satisfactorily in the state shown in FIG. 2B, it is no problem that the received mail is displayed. Also, usability when the user creates the mail increases by a structure in which the received mail is displayed by shifting the casing a little so that the mobile telephone 100 in the first form is in a form closer to the second form.

First Modification of the First Embodiment

The first embodiment is described supposing that the mobile telephone 100 is a sliding mobile telephone. The following description is given of a case where the mobile telephone 100 is a folding mobile telephone.

Figure 7A:
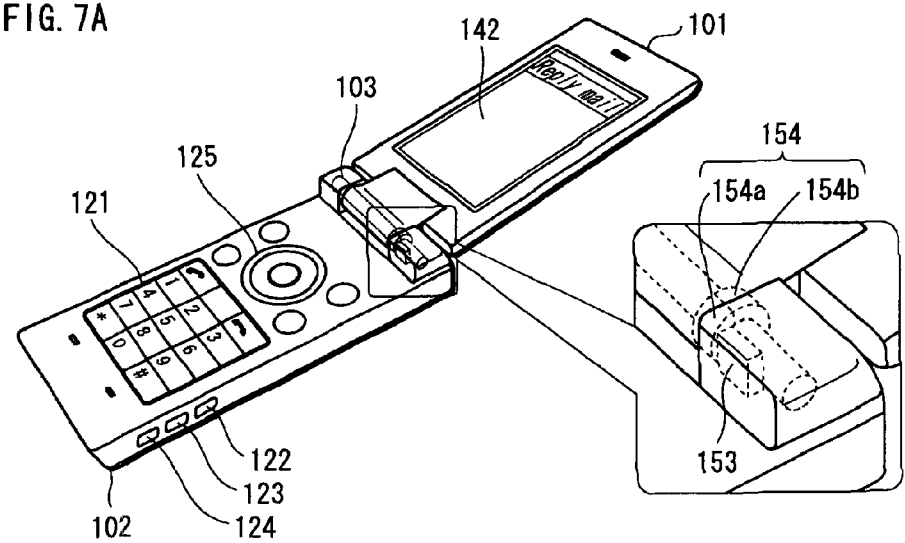
FIG. 7A to FIG. 7C each show an external view of the mobile telephone 100 that is a folding mobile telephone, as a modification of the first embodiment.
Figure 7B:
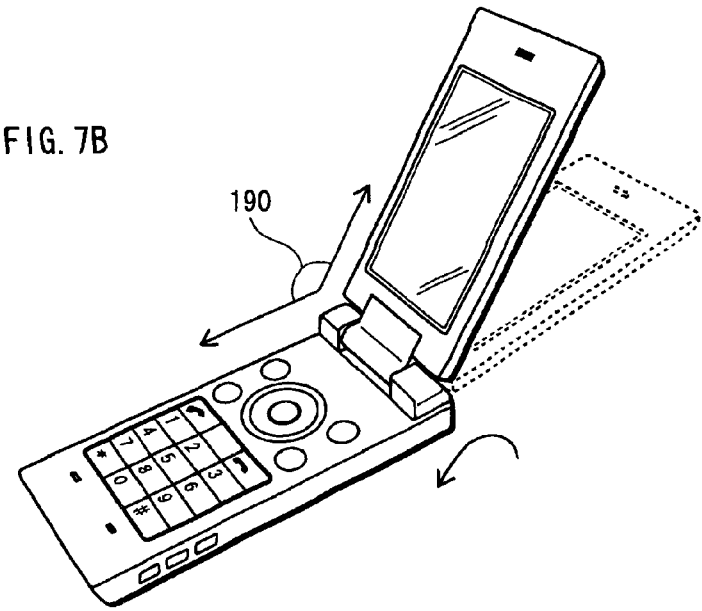
Figure 7C:
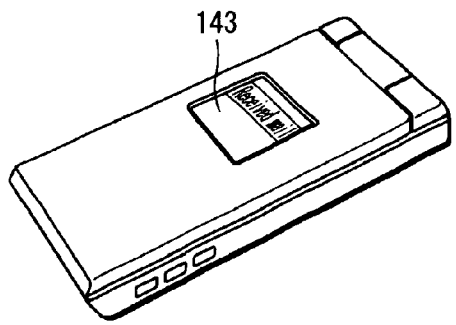

Each of FIG. 7A to FIG. 7C shows an external view of the folding mobile telephone. FIG. 7A shows that the folding mobile telephone is in an open state. This state is referred to as a "first form" of the folding mobile telephone. As shown in FIG. 7A, the upper casing 101 and the lower casing 102 are connected via a hinge 103 so as to be rotatable. A circular magnet 154 is attached to the hinge 103 so as to surround the hinge 103. A hall element 153 is embedded in the lower casing 102 so as to detect a magnetic field. Note that a 154a is a north pole portion and a 154b is a south pole portion.

The lower casing 102 includes side keys 122 to 124. The side key 122 is used for calling a menu in the second form, for example. Also, the side key 123 corresponds to an upper key, and the side key 124 corresponds to a lower key. The side keys 123 and 124 are used for scrolling through the text of the received mail when the received mail is displayed.

The first embodiment and the modification thereof are different from each other in how the detection unit 150 detects whether or not the mobile telephone 100 is in the first form. The detection unit 150 is composed of the hall element 153 and the circular magnet 154 instead of the magnet 152 and the magnet sensor 151 in the present modification. The hall element 153 detects the magnetic field, and is an element that outputs a voltage value according to the strength of the detected magnetic field. When the hall element 153 outputs a predetermined voltage value, the detection unit 150 outputs, to the control unit 170, a signal indicating the output of the predetermined value. Upon reception of the signal, the control unit 170 recognizes that the mobile telephone 100 is in the first form. The predetermined voltage value is stored in the detection unit 150 when the mobile telephone 100 is manufactured, and is a voltage value outputted by the hall element 153 when the mobile telephone 100 is in the first form as shown in FIG. 7A. The detection unit 150 compares the voltage value outputted from the hall element 153 with the predetermined voltage value stored in the detection unit 150. When these voltage values are the same, the detection unit 150 outputs, to the control unit 170, the signal showing that the mobile telephone 100 is in the first form. When these values are not the same, the detection unit 150 outputs, to the control unit 170, the signal showing that the mobile telephone 100 is not in the first form.

When the folding mobile telephone is in the state shown in FIG. 7A, the hall element 153 included in the detection unit 150 outputs the predetermined voltage value. Therefore, the control unit 170 included in the mobile telephone 100 controls the display unit 140 to display the reply mail on the display 142 included in the display unit 140.

The state of the folding mobile telephone shown in FIG. 7C is referred to as the second form. However, the hall element 153 included in the detection unit 150 does not output the voltage value in the second form. Therefore, the detection unit 150 outputs, to the control unit 170, the signal showing that the mobile telephone 100 is not in the first form, and the control unit 170 controls the display unit 140 to display the received mail on the display 143.

Also, since the hall element 153 does not output the predetermined voltage value in the state shown in FIG. 7B, the control unit 170 detects that the mobile telephone 100 is not in the first form. Then, the control unit 170 controls the display unit 140 to display the received mail on the display 142. With such a structure, when the mobile telephone 100 is a folding mobile telephone, the display content can be switched to the received mail by slightly folding the mobile telephone 100 in the open state so that the mobile telephone 100 is in a slightly closed state. Therefore, the usability increases.

Second Modification of the First Embodiment

Although the first embodiment describes the case where the mobile telephone 100 is the sliding mobile telephone, a second modification of the first embodiment describes a case of the biaxial hinge mobile telephone. Each of FIG. 8A to FIG. 8C and FIG. 9A to FIG. 9C shows an external view of the biaxial hinge mobile telephone.

As shown in FIG. 8A, the mobile telephone 100 is the biaxial hinge mobile telephone in which the upper casing 101 and the lower casing 102 are connected via a biaxial hinge 104. An axis 104a shown in FIG. 8A is a first axis for rotation. This first axis corresponds to a hinge of the folding mobile telephone. An axis 104b is a second axis that is orthogonal to the axis 104a. This axis 104b allows the upper casing 101 to rotate as shown in FIG. 9A to FIG. 9C.

The present modification and the first embodiment are different in positions of the magnet sensor 151 and the magnet 152 included the detection unit 150. Therefore, as with the first embodiment, the detection unit 150 outputs, to the control unit 170, the signal showing that the magnet sensor 151 detects the magnet 152, and the control unit 170 recognizes that the mobile telephone 100 is in the first form in the present modification. The magnet sensor 151 and the magnet 152 are arranged as shown in FIG. 8A and FIG. 9A.

Figure 9:
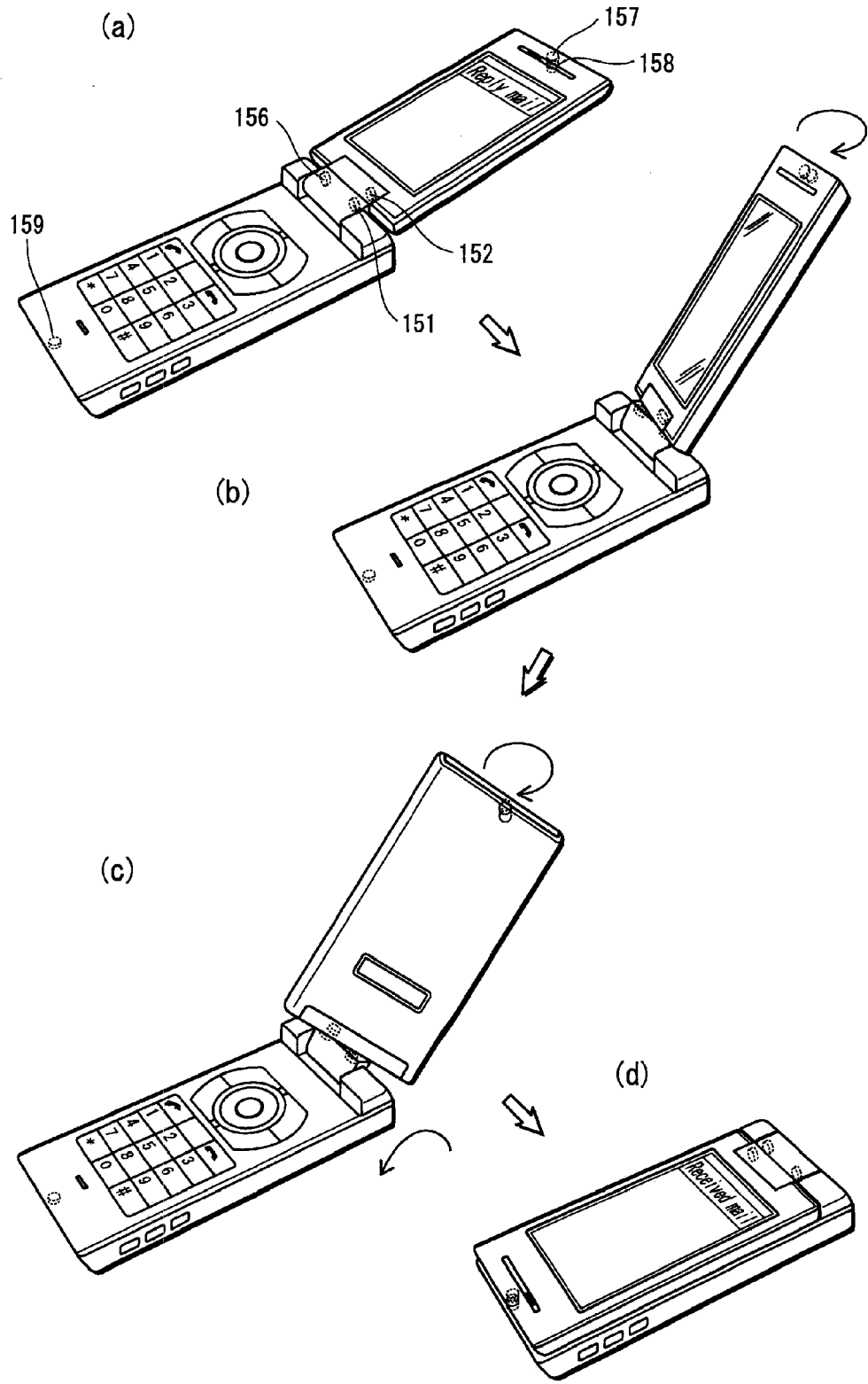
FIG. 9A to FIG. 9D each show an external view of the mobile telephone 100 that is a biaxial hinge-type mobile telephone, as a modification of the first embodiment.

A state shown in each of FIG. 8A and FIG. 9A is referred to as the first form of the biaxial hinge mobile telephone, and the magnet sensor 151 detects the magnet 152. While the magnet sensor 151 detects the magnet 152, the mobile telephone 100 recognizes that the mobile telephone 100 is in the first form. As FIG. 8A to FIG. 8C shows how the form of the biaxial mobile telephone changes, the biaxial hinge mobile telephone can be folded so as to be in a closed state as with the folding mobile telephone. However, unlike the folding mobile telephone, on an opposite surface to a display surface on which the display is provided, the biaxial mobile telephone does not include a liquid crystal display large enough to display the text although the biaxial mobile telephone may have a small liquid crystal display for displaying time as shown in FIG. 8C. This is because the biaxial mobile telephone can be folded with the display exposed shown in as FIG. 9A to FIG. 9D.

In the states shown in FIG. 8A and FIG. 9A, since the detection unit 150 outputs the signal showing that the magnet sensor 151 detects the magnet 152, the control unit 170: recognizes that the mobile telephone 100 is in the first form; and has the reply mail displayed on the display.

In the state shown in FIG. 9D, the detection unit 150 outputs, to the control unit 170, the signal showing that the magnet sensor 151 does not detect the magnet 152. Therefore, the control unit 170: recognizes that the mobile telephone 100 is not in the first form; and has the received mail displayed on the display. Note that when recognizing that the magnet sensor 158 detects the magnet 159 and that the mobile telephone 100 is in the closed state, the control unit 170 turns part or an entirety of the upper casing so that the display screen of the display is upside down. Therefore, the user can easily read the received mail.

Also, in the states shown in FIG. 8B, FIG. 9B and FIG. 9C, the detection unit 150 outputs, to the control unit 170, the signal showing that the magnet sensor 151 does not detect the magnet 152. Therefore, the control unit 170 controls the display unit 140 to display the received mail on the display after recognizing that the mobile telephone 100 is not in the first form. With such a structure, when the mobile telephone 100 is the biaxial hinge mobile telephone, the display content can be switched to the received mail by turning the first casing a little without changing the form of the mobile telephone 100 to the form as shown in FIG. 9D. Therefore, the usability increases.

Second Embodiment

In the first embodiment, the switching of the display content between the reply mail and the received mail can be performed by changing the form of the mobile telephone 100. In the second embodiment, other functions are described that are more convenient and useful than the functions described in the first embodiment.

Structure

A functional structure of the mobile telephone 100 is basically the same as the functional structure of the mobile telephone 100 described in the first embodiment. Therefore, only additional functions are described in the following.

The control unit 170 has, in addition to the functions described in the first embodiment, functions of: receiving, from the operation unit 120, a signal input from the side key 122 by the user while controlling the display unit 140 to display the received mail; displaying menus; and executing processing in accordance with the selected menu.

Also, the control unit 170 has a function of executing processing of copying the text of the received mail in accordance with the input from the user when the side key 122 is pressed for a long time. Also, when the text of the received mail is copied, and the control unit 170 switches the display content to the reply mail after the detection unit 150 detects that the mobile telephone 100 returns to the first form, the control unit 170 has a function of inserting the copied text of the received mail at a cursor position where the cursor has been positioned at the time when the immediately previous switching from the reply mail to the received mail has been performed.

Operation

Figure 10:
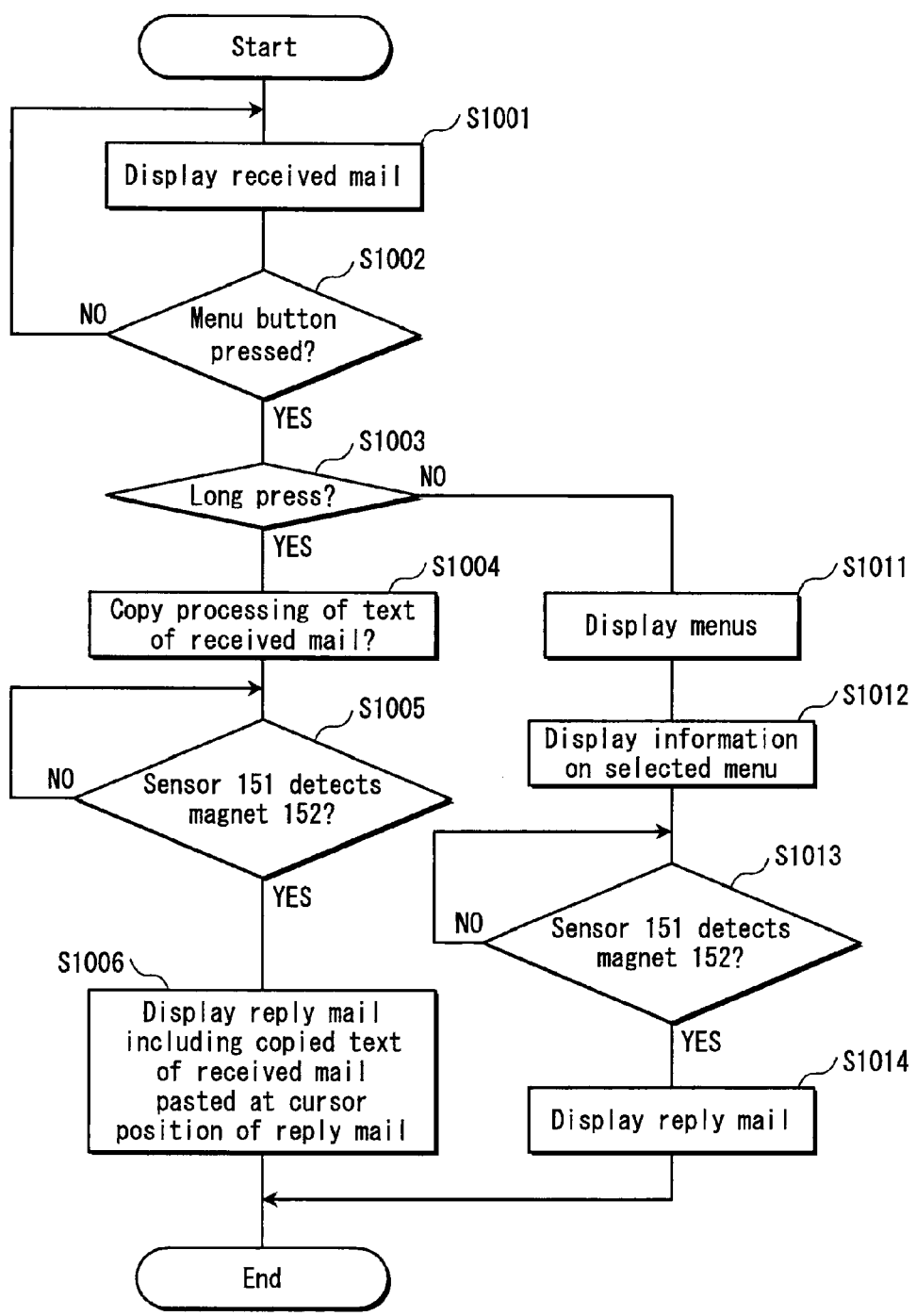
FIG. 10 is a flowchart showing an operation of the mobile telephone 100 when the received mail is displayed.

FIG. 10 is a flowchart showing an operation of the mobile telephone 100 in the second embodiment. The operation is performed when the form of the mobile telephone 100 in the first form changes and the received mail is displayed, while the user creates the reply mail.

The control unit 170 included in the mobile telephone 100 controls the display unit 140 to display the received mail (Step S1001).

The mobile telephone 100 checks whether or not a signal showing that a menu button is pressed from the operation unit 120 (i.e. whether or not the side key 122 is pressed) is received (Step S1002).

When the side key 122 of the operation unit 120 is pressed, the control unit 170 detects whether the side key 122 is pressed for a long time (Step S1003).

When the side key is pressed for a long time (Step S1003: YES), the control unit 170 executes processing of copying the text of the received mail based on the input operation by the user (Step S1004). Specifically, a start position of part or all of the text to be copied is determined by pressing the side key 122 of the operation unit 120; the user moves the cursor position by pressing the side keys 123 and 124; an end position of the part or all of the text to be copied is determined by pressing the side key 122 of the operation unit 120; and a string of letters from the start position to the end position is stored in the RAM of the storage unit 160. Note that the side key is detected to be pressed for a long time when the side key 122 is pressed for a predetermined time period (e.g. one second or more).

Then, the control unit 170 monitors whether or not a signal showing that the magnet sensor 151 detects the magnet 152 is received from the detection unit 150 (Step S1005). Until the magnet sensor 151 detects the magnet 152 (Step S1005: NO), the control unit 170 controls the display unit 140 to display the received mail.

When the magnet sensor 151 detects the magnet 152 (Step S1005: YES), the control unit 170 recognizes that the mobile telephone 100 returns to the first form. Then, the control unit 170 displays the reply mail after inserting the copied part the received mail at a cursor position of the reply mail that has been unchanged since the last switching from the reply mail to the received mail (Step S1006).

When the side key 122 is not pressed for along time (Step S1003: NO), on the other hand, the control unit 170 controls the display unit 140 to display the menu at the time of displaying the received mail (Step S1011). Examples of the displayed menus are a menu for displaying the received mail list and a menu for displaying a profile. The menus are described in detail later.

The control unit 170 displays information on a menu selected by the user from the displayed menus (Step S1012).

The control unit 170 monitors whether the signal is received that shows whether the magnet sensor 151 detects the magnet 152 (Step S1031). When the magnet sensor 151 detects the magnet 152 (Step S1013: YES), the control unit 170 controls the display unit 140 to display the received mail after recognizing that the mobile telephone 100 returns to the first form. Note that when the menu for returning to the display of the received mail is selected in the Step S1012, the control unit 170 displays the received mail (Step S1001).

A copy-and-paste operation from among the operations described in the above is specifically described with use of FIG. 11A to FIG. 11D. FIG. 11A to FIG. 11D show transitions of the display screen when the operations from Step S1004 to Step S1006 shown in FIG. 10 are executed.

Figure 11D:
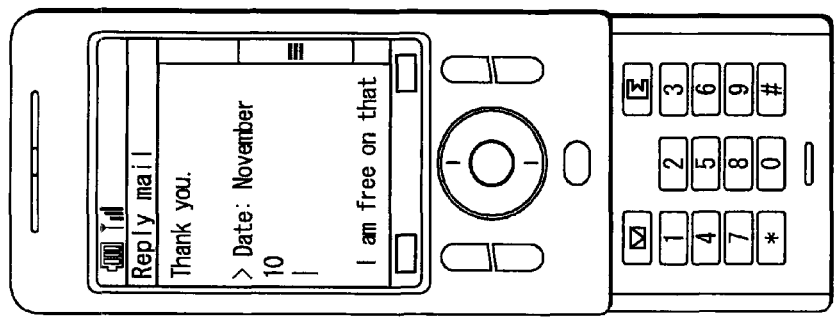
FIG. 11A to FIG. 11D each show a screen of the mobile telephone 100 when a copy-and-paste operation is executed.
Figure 11C:
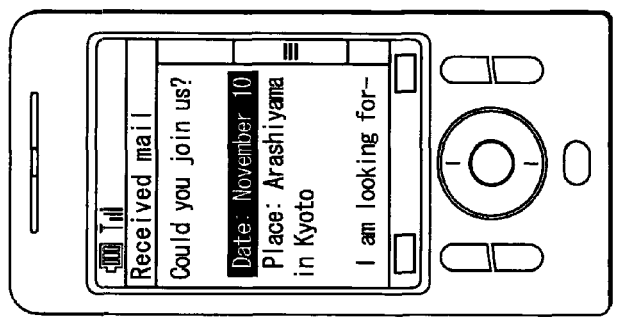
Figure 11B:
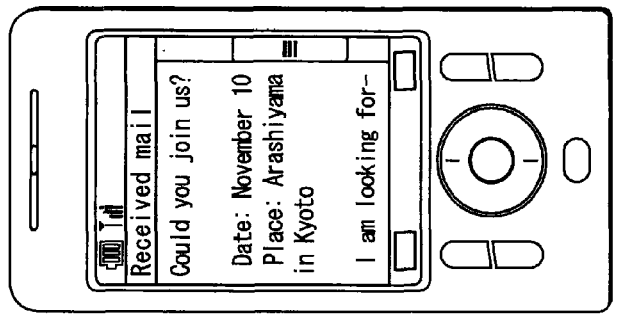
Figure 11A:
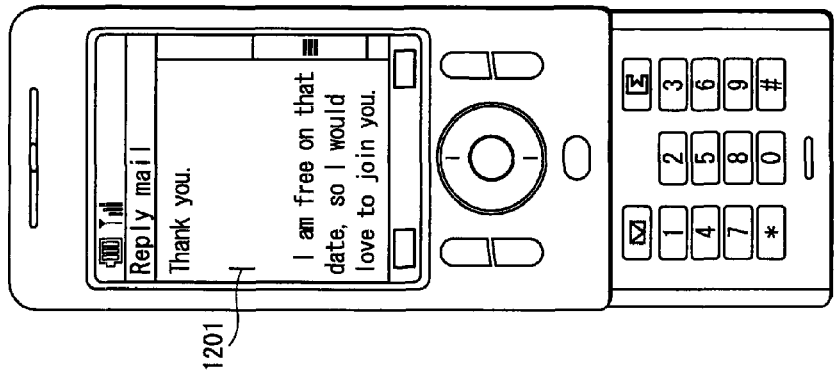

When the mobile telephone 100 is in the first form, the display unit 140 displays the reply mail as shown in FIG. 11A.

Then, when the form of the mobile telephone 100 changes to the second form, the display unit 140 displays the received mail as shown in FIG. 11B.

If part of the text included in a highlighted range as shown in FIG. 11C is selected to be copied with the side key 122 pressed by the user for a long time, the mobile telephone 100 temporarily stores the selected part.

Then, when the mobile telephone 100 returns to the first form, the control unit 170 inserts, at a position of the cursor 1201 in the reply mail shown in FIG. 11A, the copied part that has been selected in FIG. 11C, and controls the display unit 140 to display the reply mail on the display as shown in FIG. 11D.

In such a way, the copied part can be easily pasted by changing the form of the mobile telephone 100 without executing the menu selection processing such as pasting the copied part in the reply mail.

Figure 12A:
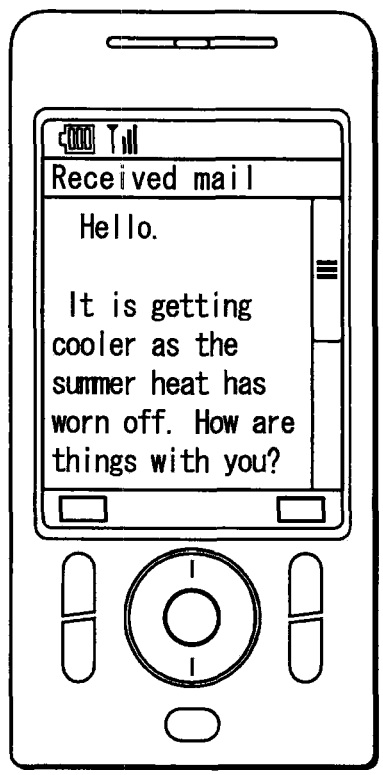
FIG. 12A and FIG. 12B each show a screen of the mobile telephone 100 showing a menu when the received mail is displayed.
Figure 12B:
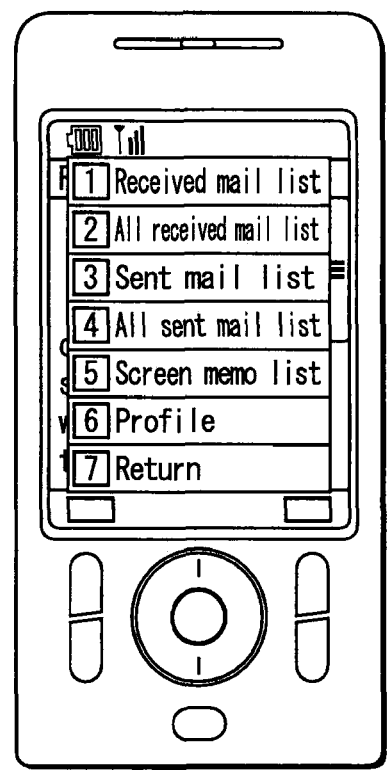

The menu display in Step S1011 of the flowchart in FIG. 10 is described with use of FIG. 12A and FIG. 12B.

While the display unit 140 displays the received mail in the second form as shown in FIG. 12A, the display unit 140 displays the menu list as shown in FIG. 12B if the user performs a short press on the side key 122. Then, the mobile telephone 100 executes the processing in accordance with selection by the user, and the display unit 140 displays the information to be displayed.

The menus are described in the following.

Firstly, when the received mail list which is a top menu is selected, the display unit 140 displays the mail list of only received mails received from the address from which the received mail displayed in FIG. 11B has been sent. Subsequently, the display unit 140 displays the received mail selected by the user. This can be realized by selecting the received mail including an address written in the sender column that corresponds to an address to which the reply mail is to be sent.

When the user selects an all received mail list second from the top of menus, the display unit 140 displays the mail list including all the received mails, and subsequently displays the received mail selected by the user.

When the user selects a sent mail list third from the top of the menus, the display unit 140 displays a mail list including only mails sent from the mobile telephone 100 to the device that has sent the received mail displayed in FIG. 11B. Subsequently, the display unit 140 displays a sent mail selected by the user. This can be realized by selecting the sent mails each address of which written in the destination address column corresponds to an address to which the reply mail being created is to be sent.

When the user selects an all sent mail list fourth from the top of the menus, the display unit 140 displays a mail list including all sent mails sent by the mobile telephone 100, and subsequently displays the sent mail selected by the user.

When the user selects a screen memo list fifth from the top of the menus, the display unit 140 displays a list of screen memos that have been browsed by the user on the net and stored, and displays information on a screen memo selected by the user.

When the user selects a profile sixth from the top of the menus, the display unit 140 displays a profile of the user of the mobile telephone 100 or a profile of the sender of the received mail according to a selection by the user.

When the user selects a return menu seventh from the top of the menus, the display unit 140 displays the received mail as shown in FIG. 12A.

With the above-stated structure, the mails that have been sent from the sender of the received mail can be displayed in creating the reply mail. Therefore, the usability of the mobile telephone 100 increases even more.

Supplemental Remarks

Although the present invention is described by way of the above embodiments, it should be noted that the present invention is not limited to the specific embodiments. The following describes various modifications included in the present invention as an idea thereof in addition to the above-described embodiments.

(1) The present invention may relate to a method of switching the display content between the reply mail and the received mail as described in the above embodiments. Also, the present invention may relate to a computer program that is for switching the display content, and is read and executed by a computer included in the mobile telephone so as to realize the method for switching the display content.

Also, the present invention may relate to a recording medium such as a memory, an FD (Flexible Memory), an MD (Magneto-optical Disc), a CD (Compact Disc) or a BD (Blu-ray Disc) on which the computer program is stored.

(2) Although the mobile telephone is used as the mobile terminal relating to the present invention to describe the above embodiments, the mobile terminal is not limited to the mobile telephone. Therefore, the mobile terminal may be a terminal such as a PDA that is transformable and has a function of sending and receiving mails.

(3) Data of the received mail may include information such as a sent date and sent time that are not particularly described in FIG. 3, for example, in the above embodiments in addition to the information described therein.

(4) The following briefly describes, with use of a drawing, how the received and reply mails are displayed when scrolling is performed.

Each of FIG. 13A to FIG. 13D shows the display screen of the mobile telephone 100 and a concrete example showing that even when the display unit displays again, after displaying the reply mail, the received mail that has been scroll-displayed, the control unit 170 controls the display unit to display part of a text of the received mail that has been immediately previously displayed on the display.

Figure 13D:
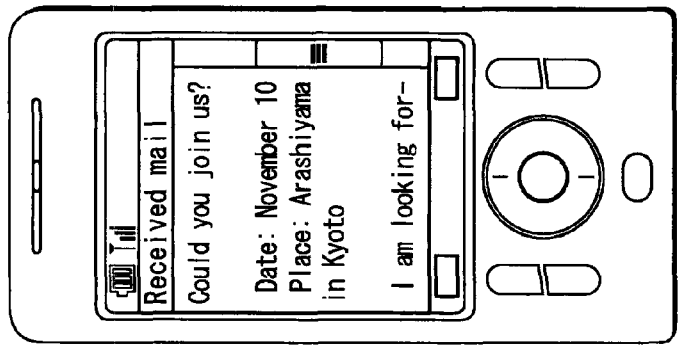
FIG. 13A to FIG. 13D each show a screen of the mobile telephone 100 when the received mail is scroll-displayed.
Figure 13C:
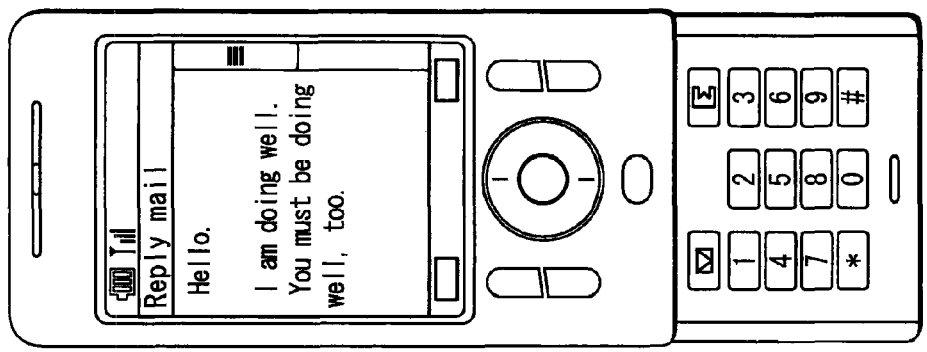
Figure 13B:
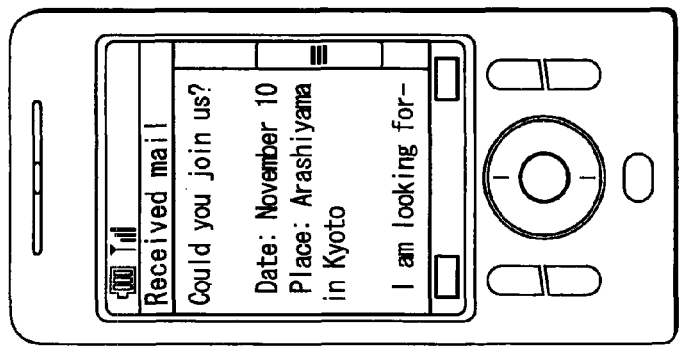
Figure 13A:
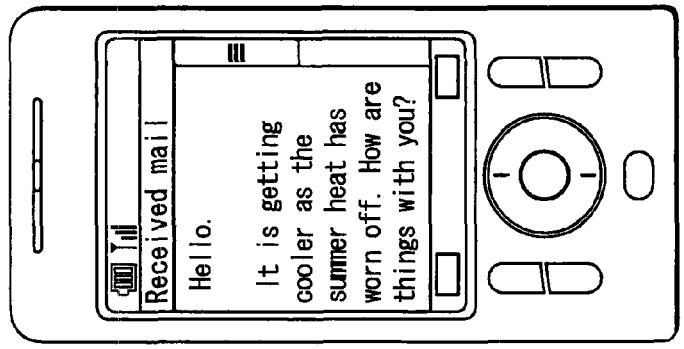

As shown in FIG. 13A, the display unit 140 displays the received mail in the second form. In the following, it is supposed that the received mail is displayed as shown in FIG. 13B after the user has scrolled through the received mail for reading the entire received mail.

If the user has changed the form of the mobile telephone 100, the display unit 140 displays the reply mail as shown in FIG. 13C. At this time, as shown in FIG. 13B, the mobile telephone 100 stores, in the storage unit 160, a start line of the received mail included in the display screen.

If the user has changed again the form of the mobile telephone 100 into the second form, the mobile telephone 100 reads, from the storage unit 160, the start line of the received mail after the last scrolling, and displays the received mail as shown in FIG. 13D.

In such a way, it is not necessary to repeatedly scroll through the received mail in order to check the received mail.

(5) In the above-described embodiments, even when the display unit 140 displays again, after displaying one of the mails, the other one of the mails that has been scroll-displayed, the control unit 170 can control the display unit 140 to display part of a text of the other one of the mails that has been immediately previously displayed on the display. However, the mobile telephone 100 may display the received mail or the reply mail with a start line of the received mail or the reply mail being a top line thereof.

(6) In the above-described embodiments, the mobile terminal detects whether the mobile terminal is in the first form or not. However, the mobile terminal may switch the display content between the reply mail and the received mail by detecting the second form instead of the first form.

The present mobile telephone includes elements, such as the magnet sensor 159 and the magnet 157 as shown in FIG. 8A to FIG. 8C showing the biaxial hinge mobile telephone 100, which are capable of detecting the second form. Therefore, the mobile telephone 100 may judge whether to display the reply mail or the received mail based on whether the mobile telephone 100 is in the second form. With such a structure, the mobile telephone 100 can switch the display content between the reply mail and the received mail according to the change in the form of the mobile telephone 100 without a new sensor. In this case, however, each of the folding mobile telephones as shown in FIG. 6B and the biaxial hinge mobile telephone as shown in FIG. 9B displays the reply mail.

(7) Although the reply mail is being created in the above-described embodiments, the reply mail may have been created or sent. Regardless of whether the reply mail is being created or not, the mobile terminal should switch the display content between the reply mail and the received mail corresponding to the reply mail according to the change in the from of the mobile terminal.

(8) Although hard keys are used as the group of numerical keys in the above-described embodiments, the group of numerical keys may be an input device such as a touch panel that receives input from software processing.

(9) In the above-described embodiments, the magnet sensor, for example, are used for recognizing that the mobile telephone 100 is in the first form. However, this recognition may be performed by other methods.

In the case of the sliding mobile telephone in the above-described first embodiment, for example, the control unit 170 may recognize that the mobile telephone 100 is in the first form with the following structure. According to the structure, an terminal provided with the upper casing 101 is configured to be in contact with an terminal provided with the lower terminal 102 in the state shown in FIG. 2A; a predetermined amount of current voltage flows while the terminals are in contact with one another; and the flow of the predetermined amount of the current voltage allows the control unit 170 to recognize that the mobile telephone 100 is in the first form.

Also, in the second modification of the first embodiment, the control unit 170 recognizes that the mobile telephone 100 is in the first form when the magnet sensor 151 detects the magnet 152, for example. However, the detection may be performed in the detection method used for the folding mobile telephone with a rotation angular sensor provided with the biaxial hinge axis 104b instead of the magnet sensor 151.

Alternatively, a light sensor that detects a predetermined color, for example, may be used instead of the magnet sensor.

(10) Although the LCD is used as the display to describe the above embodiments, the display does not have to be the LCD, and may be a PDP (plasma display panel), for example.

(11) Each of the sliding mobile telephone, the folding mobile telephone and the biaxial hinge mobile telephone are used as the transformable mobile terminal to describe the above embodiments. However, the mobile terminal may be any mobile terminal that is transformable. For example, the mobile telephone may transform in a way that the numerical keys are covered with a specific cover.

Alternatively, a mobile telephone is possible that has a structure in which the upper casing 101 and the lower casing 102 are connected to one another via a hinge that is orthogonal to the hinge 103 instead of the hinge 103 of the folding mobile telephone.

(12) In the above-described embodiments, the state shown in FIG. 7A is the first form in the case of the folding mobile telephone and the state shown in FIG. 8A is the first form in the case of the biaxial hinge mobile telephone. However, the state of the first form may be determined according to a setting at the time of manufacturing the mobile terminal. Therefore, the state shown in FIG. 7B or the state shown in FIG. 8B may be the first form.

(13) The side key 123 and 124 are used for scrolling through the received mail in the sliding mobile telephone of the above-described embodiment. However, since an arrow key 125 is always exposed in the case of the sliding mobile telephone, the received mail may be scrolled through with use of the arrow key 125.

(14) In the operation described in the second embodiment, when the side key 122 is pressed for a long time, the copy processing of the text of the received mail begins, and when the side key 122 is not pressed for a long time but pressed normally, the menus are called. However, these settings may be reversed. That is, when the side key is pressed for a long time, the menus are called, and when the side key is not pressed for a long time but pressed normally, the copy processing of the text of the received mail begins.

(15) The following aspects are adopted as embodiments of the present invention.

One aspect of the present invention may be a mobile terminal that transforms between a first form and a second form, the mobile terminal comprising: a display unit; a reception unit operable to receive a mail; a detection unit operable to detect whether or not the mobile terminal is in the first form; and a display control unit operable, when the detection unit detects that the mobile terminal is not in the first form while the display unit displays a reply mail to the received mail, to control the display unit to switch to displaying the received mail.

Also, when the detection unit detects that the mobile terminal is in the first form after the display control unit has performed the control, the display control unit may further control the display unit to switch to displaying the reply mail.

With such a structure, the switching of the display content from the received mail to the reply mail may be facilitated by transforming the mobile terminal.

Also, when the mobile terminal is in the first form, all keys for entering one or more characters may be exposed, and when the mobile terminal is in the second form, all the keys may be covered by at least part of the mobile terminal.

Here, the keys are for entering characters and are included in the casing of the mobile terminal. The keys may be in one-to-one correspondence with the characters. Alternatively, the keys may correspond to two or more of characters. For example, in the case of a PDA (personal digital assistant), keys are in one to one correspondence with the characters. In the case of the mobile telephone, one of the keys is in correspondence with five characters starting with "a" and one number, for example.

With such a structure, the user can enter the text of the reply mail when the mobile terminal is in the first form, while the user cannot enter the text of the reply mail when the mobile terminal is in the second form. That is, since it is no use to display the reply mail when the mobile terminal is in the second form, it is practical to display the received mail when the mobile terminal is in the second form. This is because the user can immediately see which of the reply mail and the received mail is displayed, and intuitively recognize whether or not the user can enter the text of the reply mail.

An example of the mobile terminal is a mobile telephone. The mobile telephone is often transformable (e.g. a sliding mobile telephone, a folding mobile telephone or a biaxial hinge mobile telephone). Any transformable mobile telephone can be in a form in which the keys for entering the characters are covered. It is very practical for such a mobile telephone to have a structure in which the reply mail is displayed and the text of the reply mail can be entered while the keys for entering the characters are exposed, and the reply mail cannot be edited while the keys for entering the characters are unexposed.

Also, the mobile terminal may further include a call unit operable to execute a call, wherein the keys may be numerical keys for entering the one or more characters and one or more numbers for placing a call.

The numerical keys include "0" to "9", an asterisk key and a sharp key.

Thus, the user can make a telephone call with the mobile terminal.

Also, the mobile terminal may be a folding mobile terminal composed of a first casing and a second casing that are connected via a hinge part so as to be capable of rotating, the first casing including the keys, wherein the first form may be a form in which the mobile terminal is in an open state in which a surface of the first casing on which the keys are provided do not oppose the second casing, the second form may be a form in which the mobile terminal is in a closed state in which the keys are covered by the second casing, the display unit may include a first display and a second display, the first display being provided on one surface of the second casing that opposes the surface of the first casing when the mobile terminal is in the second form, and the second display being provided on an opposite surface of the second casing to the one surface of the second casing, when the first casing and the second casing form a predetermined angle, the detection unit may detect that the mobile terminal is in the first form, when the mobile terminal is in the first form, the display control unit may control the display unit to display the reply mail on the first display, and when the mobile terminal is not in the first form, the display control unit may control the display unit to display the received mail on the second display.

Here, the angle formed by the first casing and the second casing is an angle formed by a surface of the first casing on which the plurality of predetermined keys are provided and a surface of the second casing on which the first display is provided (e.g. an angle 190 shown in FIG. 7B).

Thus, in the case of the folding mobile telephone, the display content is switched between the reply mail and the received mail depending on whether or not the folding mobile telephone is in the folded state. Therefore, the user can easily recognize which of the mails is displayed.

Also, when the detection unit detects that the mobile terminal is not in the first form, the display control unit may control the display unit to display the received mail on the first display as well as the second display.

Supposing that the folding mobile terminal is in the first form when the first casing and the second casing are fully opened, the display content is switched from the reply mail to the received mail by changing the form of the folding mobile terminal so as to be in a form slightly close to the second form. Accordingly, the user can easily check the received mail without fully closing the casings so that the mobile terminal is in the second form.

Also, the mobile terminal may be a sliding mobile terminal including a first casing and a second casing that are configured to be movable in parallel to one another, the first casing including the keys, wherein when the mobile terminal is in the first form, the keys may not be covered by the second casing, when the mobile terminal is in the second form, the keys may be covered by the second casing, the display unit may include a display provided on the second casing, only when the mobile terminal is in the first form, the display control unit may control the display unit to display the reply mail on the display, and when the mobile terminal is not in the first form, the display control unit may control the display unit to display the received mail on the display.

Thus, in the case of the sliding mobile terminal, the display content is switched between the reply mail and the received mail depending on whether the sliding mobile terminal is in a non-available state or in an available state. In the non-available state, the user cannot enter the characters from the keys for entering the characters because the first casing and the second casing overlap one another at sides where the first casing and second casing oppose each other. In the available state, the user can enter the characters from the keys because the first casing and the second casing do not fully overlap one another at the sides. Therefore, the user can immediately recognize which of the mails is displayed, and whether or not the user can enter the text of the reply mail.

Also, the mobile terminal may be a biaxial hinge mobile terminal composed of a first casing and a second casing that are connected via a first hinge part so as to be capable of rotating, the first casing including the keys, and the second casing and part or an entirety of the first casing being capable of rotating via a second hinge part, wherein the display unit may include a display provided on one surface of the second casing, the second form may be a form in which the mobile terminal is in a closed state in which all the keys are covered by an opposite surface of the second casing to the one surface of the second casing, the first form may be a form in which the mobile terminal is in an open state in which: all the keys are exposed; the second hinge part when the mobile terminal is in the second form is rotated 180 degrees; and the first casing and the second casing form a predetermined angle, via the first hinge part, that is different from an angle formed by the first casing and the second casing via the first hinge when the mobile terminal is in the second form, and only when the mobile terminal is in the first form, the display control unit may control the display unit to display the reply mail on the display.

Here, the angle formed by the first casing and the second casing by the rotational movement of the first hinge part corresponds to an angle formed by the first casing and the second casing in the case of the above-stated folding mobile terminal (e.g. an angle 191 shown in FIG. 8B).

Thus, in the case of the biaxial mobile terminal, a slight rotation of the second hinge part from a predetermined position switches the display content from the reply mail to the received mail. Therefore, the user can switch the display content from the reply mail to the received mail by an easy operation of slightly rotating the second hinge part.

Also, when receiving a user input from a key other than the keys while the display unit displays the received mail, the display control unit may control the display unit to scroll-display a text of the received mail, and when the display unit displays again, after displaying the reply mail, the received mail that have been scroll-displayed, the display control unit may control the display unit to display part of the text of the received mail that has been immediately previously displayed.

Thus, in the case where the user checks the received mail by scrolling through the received mail while creating the reply mail, when the user returns to create the reply mail, and then checks the received mail again, the control unit 170 can control the display unit 140 to display part of the text of the received mail that has been immediately previously displayed on the display. In creating the reply mail while checking the received mail, the user normally follows what is written in the received mail in order. Therefore, the above-described structure is convenient for the user in creating the reply mail while checking the received mail.

Also, the mobile terminal may further comprise a range selection unit operable, when the display control unit receives a user input from a key other than the keys while the display unit displays the received mail, to select part or an entirety of a text of the received mail based on the predetermined user input, wherein when the detection unit detects that the mobile terminal is in the first form, the selected part or the selected entirety of the text of the received mail may be inserted at a cursor position of the reply mail.

Thus, conventionally-performed operational procedures are unnecessary of selecting a menu while the reply mail is displayed, and selecting operations of copying and pasting the selected text. Therefore, the copy-and-paste operation from the received mail to the reply mail can be facilitated.

Also, the mobile terminal may further comprise a storage unit operable to store therein the reply mail in correspondence with the received mail.

With such a structure, the mobile terminal can display a received mail corresponding to the reply mail correctly, even when a plurality of received mails exist.

Also, the mobile terminal of the present invention may be a mobile terminal that transforms between: a first form in which at least part of keys for entering one or more characters is exposed; and a second form in which the keys are covered, the mobile terminal comprising: a display unit; a reception unit operable to receive a mail; a detection unit operable to detect whether or not the mobile terminal is in the second form; and a display control unit operable, when the detection unit detects that the mobile terminal is in the second form while the display unit displays a reply mail to the received mail, to control the display unit to switch to displaying the received mail.

Also, when the detection unit detects that the mobile terminal is not in the second form after the display control unit has performed the control, the display control unit may further control the display unit to switch to displaying the reply mail.

The current mobile telephone which is an example of the mobile terminal has already included an element that detects that the mobile telephone is in the second form. Therefore, the above-stated structure can be easily realized without preparing a new detection element.

INDUSTRIAL APPLICABILITY

The mobile terminal pertaining to the present invention as a transformable mobile telephone is useful when the user creates the reply mail while the received mail is displayed.

The invention claimed is:

1. A mobile terminal that transforms between a first form and a second form, the mobile terminal comprising:
   a display unit;
   a reception unit operable to receive a mail;
   a detection unit operable to detect whether the mobile terminal is in the first form or the second form; and
   a display control unit operable to,
      when the mobile terminal is changed from the second form to the first form while the display unit displays a received mail, control the display unit to switch to displaying a screen for editing a reply mail to the received mail, and,
   thereafter, when the mobile terminal is changed from the first form to the second form while the display unit displays the screen for editing the reply mail to the received mail, control the display unit to switch to displaying the received mail.

2. The mobile terminal of claim 1, wherein when the mobile terminal is in the first form, all keys for entering one or more characters are exposed, and when the mobile terminal is in the second form, all the keys are covered by at least part of the mobile terminal.

3. The mobile terminal of claim 2, further comprising, a call unit operable to execute a call, wherein the keys are numerical keys for entering the one or more characters and one or more numbers for placing a call.

4. The mobile terminal of claim 3, being a folding mobile terminal composed of a first casing and a second casing that are connected via a hinge part so as to be capable of rotating, the first casing including the keys, wherein
   the first form is a form in which the mobile terminal is in an open state in which a surface of the first casing on which the keys are provided do not oppose the second casing,
   the second form is a form in which the mobile terminal is in a closed state in which the keys are covered by the second casing,
   the display unit includes a first display and a second display, the first display being provided on one surface of the second casing that opposes the surface of the first casing when the mobile terminal is in the second form, and the second display being provided on an opposite surface of the second casing to the one surface of the second casing, and
   when the first casing and the second casing form a predetermined angle, the detection unit detects that the mobile terminal is in the first form, and
wherein
   displaying a screen for editing a reply mail to the received mail comprises displaying the screen for editing a reply mail on the first display, and
   displaying the received mail comprises displaying the received mail on the second display.

5. The mobile terminal of claim 4, wherein when the detection unit detects that the mobile terminal is in the second form, the display control unit controls the display unit to display the received mail on the first display as well as the second display.

6. The mobile terminal of claim 3, being a sliding mobile terminal including a first casing and a second casing that are configured to be movable in parallel to one another, the first casing including the keys, wherein
   when the mobile terminal is in the first form, the keys are not covered by the second casing,
   when the mobile terminal is in the second form, the keys are covered by the second casing,
   the display unit includes a display provided on the second casing,
   only when the mobile terminal is in the first form, the display control unit controls the display unit to display the screen for editing the reply mail on the display, and
   when the mobile terminal is in the second form, the display control unit controls the display unit to display the received mail on the display.

7. The mobile terminal of claim 3, being a biaxial hinge mobile terminal composed of a first casing and a second casing that are connected via a first hinge part so as to be capable of rotating, the first casing including the keys, and the second casing and part or an entirety of the first casing being capable of rotating via a second hinge part, wherein
   the display unit includes a display provided on one surface of the second casing,
   the second form is a form in which the mobile terminal is in a closed state in which all the keys are covered by an opposite surface of the second casing to the one surface of the second casing,
   the first form is a form in which the mobile terminal is in an open state in which: all the keys are exposed; the second hinge part when the mobile terminal is in the second form is rotated 180 degrees; and the first casing and the second casing form a predetermined angle, via the first hinge part, that is different from an angle formed by the first casing and the second casing via the first hinge when the mobile terminal is in the second form, and
   only when the mobile terminal is in the first form, the display control unit controls the display unit to display the screen for editing a reply mail on the display.

8. The mobile terminal of claim 3, wherein when receiving a user input from a key other than the keys while the display unit displays the received mail, the display control unit controls the display unit to scroll-display a text of the received mail, and when the display unit displays again, after displaying the screen for editing a reply mail, the received mail that have been scroll-displayed, the display control unit controls the display unit to display part of the text of the received mail that has been immediately previously displayed.

9. The mobile terminal of claim 3, further comprising, a range selection unit operable, when the display control unit receives a user input from a key other than the keys while the display unit displays the received mail, to select part or an entirety of a text of the received mail based on the predetermined user input, wherein when the detection unit detects that the mobile terminal is in the first form, the selected part or the selected entirety of the text of the received mail is inserted at a cursor position of the reply mail.

10. The mobile terminal of claim 1, further comprising, a storage unit operable to store therein the reply mail in correspondence with the received mail.

11. The mobile terminal of claim 1, wherein the mobile terminal
   has a function of, when the display unit is unable to display a whole content of either the received mail or the screen for editing the reply mail to the received mail, receiving a scroll-display instruction and displaying part of the content that has not been displayed, and
   further comprises a reception unit operable to receive the scroll-display instruction,
   wherein, if the display unit displays a first partial screen showing a first part of content of either the received mail or the reply mail and the display control unit receives the scroll-display instruction from the reception unit, the display control unit controls the display unit to display a second partial screen showing a second part of the content that differs from the first part, and
   wherein, if, after the display unit displays the second partial screen, the mobile terminal transforms in an order of the first form, the second form, and the first form or in an order of the second form, the first form, and the second form, the display control unit controls the display unit to display the second partial screen.

12. A method of switching a display in a mobile terminal that changes between a first form and a second form, the method comprising, by one or more control units of the mobile terminal:
   receiving a mail;
   displaying the received mail;
   when the mobile terminal is changed from the second form to the first form while the received e-mail is being displayed, displaying a screen for editing a reply mail to the received mail; and,
   thereafter, when the mobile terminal is changed from the first form to the second form while the screen for editing the reply mail to the received mail is displayed, displaying the received mail.

13. A non-transitory computer-readable medium having stored instructions that, when executed on a mobile terminal that changes between a first form and a second form:
   receive a mail;
   display the received mail;

when the mobile terminal is changed from the second form to the first form while the received e-mail is being displayed, display a screen for editing a reply mail to the received mail; and, thereafter, when the mobile terminal is changed from the first form to the second form while the screen for editing the reply mail to the received mail is displayed, display the received mail.

* * * * *